United States Patent
Kobayashi et al.

(10) Patent No.: US 10,369,987 B2
(45) Date of Patent: Aug. 6, 2019

(54) CONTROL DEVICE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Nobufusa Kobayashi, Anjo (JP); Masato Yoshikawa, Toyota (JP); Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/800,381

(22) Filed: Nov. 1, 2017

(65) Prior Publication Data

US 2018/0148042 A1 May 31, 2018

(30) Foreign Application Priority Data

Nov. 29, 2016 (JP) ................................ 2016-231853

(51) Int. Cl.
*B60L 9/00* (2019.01)
*B60L 11/00* (2006.01)
(Continued)

(52) U.S. Cl.
CPC ............ *B60W 20/30* (2013.01); *B60K 6/365* (2013.01); *B60K 6/40* (2013.01); *B60K 6/445* (2013.01); *B60K 6/547* (2013.01); *B60W 10/06* (2013.01); *B60W 10/08* (2013.01); *B60W 10/115* (2013.01); *B60W 10/26* (2013.01); *B60W 30/19* (2013.01); *F16H 61/0437* (2013.01); *B60W 2510/0657* (2013.01); *B60W 2510/105* (2013.01); *B60W 2710/027* (2013.01);
(Continued)

(58) Field of Classification Search
CPC ...... B60W 20/30; B60W 10/06; B60W 10/11; B60W 10/08; B60W 10/115; B60W 10/26; B60W 30/19; B60K 6/365; B60K 6/40; B60K 6/445; B60K 6/547
USPC .......................................................... 701/22
See application file for complete search history.

(56) References Cited

U.S. PATENT DOCUMENTS

| | | | |
|---|---|---|---|
| 2005/0103544 A1 | 5/2005 | Takami et al. | |
| 2013/0184920 A1* | 7/2013 | Otsubo | B60K 6/365 701/22 |
| 2014/0243150 A1 | 8/2014 | Choi | |

(Continued)

FOREIGN PATENT DOCUMENTS

| | | |
|---|---|---|
| EP | 2754597 A1 | 7/2014 |
| JP | 2006-009942 A | 1/2006 |

(Continued)

OTHER PUBLICATIONS

Jun. 4, 2018 Notice of Allowance issued in U.S. Appl. No. 15/487,828.

(Continued)

*Primary Examiner* — Mahmoud S Ismail
(74) *Attorney, Agent, or Firm* — Oliff PLC

(57) ABSTRACT

Transmission torque of a shift progress side engagement device is set based on engine power, shift progressing power, and battery power such that MG1 torque and MG2 torque are limited due to the limitation of the battery power when shifting a stepped transmission is suppressed. The stepped transmission is shifted with the transmission torque which takes into account the input-output balance of the respective powers.

5 Claims, 5 Drawing Sheets

(51) Int. Cl.
    *G05D 1/00*     (2006.01)
    *G05D 3/00*     (2006.01)
    *G06F 7/00*     (2006.01)
    *G06F 17/00*     (2019.01)
    *B60W 20/30*     (2016.01)
    *B60K 6/40*     (2007.10)
    *B60K 6/547*     (2007.10)
    *B60K 6/365*     (2007.10)
    *B60K 6/445*     (2007.10)
    *B60W 10/06*     (2006.01)
    *B60W 10/08*     (2006.01)
    *B60W 10/115*     (2012.01)
    *B60W 10/26*     (2006.01)
    *B60W 30/19*     (2012.01)
    *F16H 61/04*     (2006.01)
    *F16H 61/02*     (2006.01)

(52) U.S. Cl.
    CPC .. *B60W 2710/0677* (2013.01); *B60W 2710/10* (2013.01); *F16H 61/0213* (2013.01); *Y02T 10/7258* (2013.01)

(56) References Cited

U.S. PATENT DOCUMENTS

2014/0287869 A1     9/2014     Kato et al.
2014/0343775 A1     11/2014     Yamamoto et al.
2015/0246670 A1     9/2015     Ideshio et al.
2015/0246671 A1     9/2015     Imamura et al.
2015/0336571 A1     11/2015     Kuwahara et al.

FOREIGN PATENT DOCUMENTS

| | | |
|---|---|---|
| JP | 2007-092665 A | 4/2007 |
| JP | 2010-188794 A | 9/2010 |
| JP | 2012-158264 A | 8/2012 |
| JP | 5413519 B2 | 2/2014 |
| JP | 2014-184804 A | 10/2014 |
| JP | 2014-223888 A | 12/2014 |
| WO | 2012/042590 A1 | 4/2012 |

OTHER PUBLICATIONS

Jun. 27, 2018 Corrected Notice of Allowability issued in U.S. Appl. No. 15/487,828.
Jul. 30, 2018 Corrected Notice of Allowability issued in U.S. Appl. No. 15/487,828.
Feb. 6, 2018 Office Action issued in U.S. Appl. No. 15/487,828.
U.S. Appl. No. 15/487,828, filed Apr. 14, 2017 in the name of Kobayashi et al.
Sep. 14, 2018 Corrected Notice of Allowability issued in U.S. Appl. No. 15/487,828.

\* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| VIRTUAL GEAR POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 | ized engagement devices of a plurality of engagement
CONTROL DEVICE AND CONTROL METHOD FOR HYBRID VEHICLE

INCORPORATION BY REFERENCE

The disclosure of Japanese Patent Application No. 2016-231853 filed on Nov. 29, 2016 including the specification, drawings and abstract is incorporated herein by reference in its entirety.

BACKGROUND

1. Technical Field

The disclosure relates to a control device and a control method for a hybrid vehicle including a differential mechanism and a stepped transmission disposed in series.

2. Description of Related Art

Japanese Patent Application Publication No. 2014-223888 (JP 2014-223888 A) discloses a control device for a hybrid vehicle including an engine, a differential mechanism, a second rotary machine, a stepped transmission and an electric power storage device. In JP 2014-223888 A, the differential mechanism has three rotary elements to which the engine, a first rotary machine, and an intermediate transmission member are respectively coupled. The second rotary machine is coupled to the intermediate transmission member in a power transmittable manner. The stepped transmission forms a part of a power transmission path between the intermediate transmission member and drive wheels and is configured to engage predetermined ones of a plurality of engagement devices so as to establish a corresponding one of a plurality of gear positions. The electric power storage device is configured to supply and receive electric power to and from each of the first rotary machine and the second rotary machine. In JP 2014-223888 A, it is disclosed that torque of the first rotary machine and torque of the second rotary machine are controlled based on torque of the engine and the torque capacity of the stepped transmission such that the change rate of the rotational speed of the second rotary machine and the change rate of the rotational speed of the engine reach their target values during shifting of the stepped transmission.

SUMMARY

If power of the electric power storage device is small when shifting the stepped transmission, output torque of the first rotary machine and output torque of the second rotary machine are limited due to the limitation of the power of the electric power storage device. Then, desired output torque of the first rotary machine or desired output torque of the second rotary machine is not obtained when shifting the stepped transmission, so that the change rate of the rotational speed of the engine may not be properly controlled to its target value. Since the change rate of the rotational speed of the engine indicates the state of progress of shifting of the entire transmission combining the differential mechanism and the stepped transmission, if the change rate of the rotational speed of the engine cannot be properly controlled to its target value, this means that the shifting of the entire transmission cannot be properly performed.

The disclosure provides a control device and a control method for a hybrid vehicle that can properly perform shifting of an entire transmission combining a differential mechanism and a stepped transmission, regardless of the limitation of power of an electric power storage device.

A first aspect of the disclosure is a control device for a hybrid vehicle. The hybrid vehicle includes an engine, a differential mechanism, a drive wheel, a first rotary machine, a second rotary machine, a stepped transmission, and an electric power storage device. The differential mechanism includes a first rotary element to which the engine is coupled in a power transmittable manner, a second rotary element to which the first rotary machine is coupled in a power transmittable manner, and a third rotary element to which an intermediate transmission member is coupled. The second rotary machine is coupled to the intermediate transmission member in a power transmittable manner. The stepped transmission is a part of a power transmission path between the intermediate transmission member and the drive wheel. The stepped transmission is configured to engage predetermined engagement devices of a plurality of engagement devices so as to establish a corresponding one of a plurality of gear positions. The electric power storage device is configured to supply and receive electric power to and from each of the first rotary machine and the second rotary machine. The control device includes an electronic control unit. The electronic control unit is configured to control release of the release-side engagement device of the predetermined engagement devices that establish the gear position before shifting and engagement of the engagement-side engagement device of the predetermined engagement devices that establish the gear position after shifting, such that the gear position that is established by the stepped transmission is changed. The electronic control unit is configured to, during shifting of the stepped transmission, control output torque of the first rotary machine and output torque of the second rotary machine based on output torque of the engine and transmission torque of a shift progress side engagement device such that a change rate of a rotational speed of the second rotary machine and a change rate of a rotational speed of the engine reach respective target values. The shift progress side engagement device is an engagement device on a side progressing the shifting and is one of the release-side engagement device and the engagement-side engagement device. The electronic control unit is configured to set transmission torque of the shift progress side engagement device based on power of the engine, power necessary for progressing shifting of the differential mechanism and the stepped transmission, and power of the electric power storage device, such that limitation of output torque of the first rotary machine and output torque of the second rotary machine due to limitation of the power of the electric power storage device when shifting the stepped transmission is suppressed.

With this configuration, the transmission torque of the shift progress side engagement device is set based on the power of the engine, the power necessary for progressing shifting of the differential mechanism and the stepped transmission, and the power of the electric power storage device such that limitation of the output torque of the first rotary machine and the output torque of the second rotary machine due to the limitation of the power of the electric power storage device when shifting the stepped transmission is suppressed. Consequently, the stepped transmission is shifted with the transmission torque of the shift progress side engagement device which takes into account the input-output balance of the respective powers. As a result, even if the power of the electric power storage device is limited when shifting the stepped transmission, desired output torque of the first rotary machine and desired output torque of the second rotary machine tend to be obtained, so that control can be properly performed so as to cause the change rate of the rotational speed of the engine to reach the target value. Therefore, shifting of the entire transmission combining the differential mechanism and the stepped transmission can be properly performed regardless of the limitation of the power of the electric power storage device.

In the above-described control device, the electronic control unit may be configured to determine whether or not input-output balance of the power of the engine, the power necessary for progressing the shifting, the power of the electric power storage device, and transmission power of the shift progress side engagement device is achieved. When the electronic control unit determines that the input-output balance is not achieved, the electronic control unit may be configured to change the power of the engine such that the input-output balance is achieved. The electronic control unit may be configured to use the changed power of the engine as the power of the engine that serves as a basis when setting the transmission torque of the shift progress side engagement device.

With this configuration, shifting of the stepped transmission that further takes into account the input-output balance of the respective powers is performed. Consequently, shifting of the entire transmission can be more properly performed.

In the above-described control device, the electronic control unit may be configured to set the transmission torque of the shift progress side engagement device based on a predetermined relationship in which a plurality of levels corresponding to magnitudes of each of the power of the engine, the power necessary for progressing the shifting, and the power of the electric power storage device are used as arguments such that the transmission torque of the shift progress side engagement device is readable as a read value according to the arguments.

When the transmission torque of the shift progress side engagement device is set based on numerical values themselves of the respective powers, a predetermined relationship (map) becomes high dimensional, and therefore, adaptation becomes complicated. In contrast, according to the above-described configuration, by setting the transmission torque of the shift progress side engagement device by means of classifications using the plurality of levels corresponding to the magnitudes of each of the respective powers (i.e. by decreasing the number of arguments), the predetermined relationship can be made low dimensional to simplify adaptation.

In the above-described control device, the electronic control unit may be configured to, when the stepped transmission is shifted up, perform an upshift of an entire transmission in which the differential mechanism and the stepped transmission are disposed in series. The electronic control unit may be configured to perform a downshift of the entire transmission when the stepped transmission is shifted down. The number of the levels in a power-on downshift of the stepped transmission may be greater than the number of the levels in a power-on upshift of the stepped transmission.

With this configuration, the power-on downshift of the stepped transmission that is difficult in shift control compared to the power-on upshift of the stepped transmission can be properly performed. In this way, since the number of arguments can be changed according to the type of shift (e.g. according to the degree of difficulty of shift control), adaptation can be more simplified as shift control becomes easier.

A second aspect of the disclosure is a control method for a hybrid vehicle. The hybrid vehicle includes an engine, a differential mechanism, a drive wheel, a first rotary machine, a second rotary machine, a stepped transmission, an electric power storage device, and an electronic control unit. The differential mechanism includes a first rotary element to which the engine is coupled in a power transmittable manner, a second rotary element to which the first rotary machine is coupled in a power transmittable manner, and a third rotary element to which an intermediate transmission member is coupled. The second rotary machine is coupled to the intermediate transmission member in a power transmittable manner. The stepped transmission is a part of a power transmission path between the intermediate transmission member and the drive wheel. The stepped transmission is configured to engage predetermined engagement devices of a plurality of engagement devices so as to establish a corresponding one of a plurality of gear positions. The electric power storage device is configured to supply and receive electric power to and from each of the first rotary machine and the second rotary machine. The control method includes: controlling, by the electronic control unit, release of the release-side engagement device of the predetermined engagement devices that establish the gear position before shifting and engagement of the engagement-side engagement device of the predetermined engagement devices that establish the gear position after shifting, such that the gear position that is established by the stepped transmission is changed; during shifting of the stepped transmission, controlling, by the electronic control unit, output torque of the first rotary machine and output torque of the second rotary machine based on output torque of the engine and transmission torque of a shift progress side engagement device such that a change rate of a rotational speed of the second rotary machine and a change rate of a rotational speed of the engine reach respective target values; and setting, by the electronic control unit, transmission torque of the shift progress side engagement device based on power of the engine, power necessary for progressing shifting of the differential mechanism and the stepped transmission, and power of the electric power storage device, such that limitation of output torque of the first rotary machine and output torque of the second rotary machine due to limitation of the power of the electric power storage device when shifting the stepped transmission is suppressed. The shift progress side engagement device is an engagement device on a side progressing the shifting and is one of the release-side engagement device and the engagement-side engagement device.

With this configuration, the same effect as the above-described control device can be obtained.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A rotational speed w of each of the rotating members (e.g. the engine, the first rotary machine, the second rotary machine, the rotary elements of the differential mechanism, the intermediate transmission member, and the rotary elements of the stepped transmission) may corresponds to an angular velocity of the rotating member, and the change rate of the rotational speed ω is the time change rate, i.e. the time differential, of the rotational speed ω and thus is an angular acceleration dω/dt of the rotating member, while the angular acceleration dω/dt may be given by $\dot{\omega}$ in a numerical formula.

Hereinbelow, an embodiment of the disclosure will be described in detail with reference to the drawings.

Figure 1:
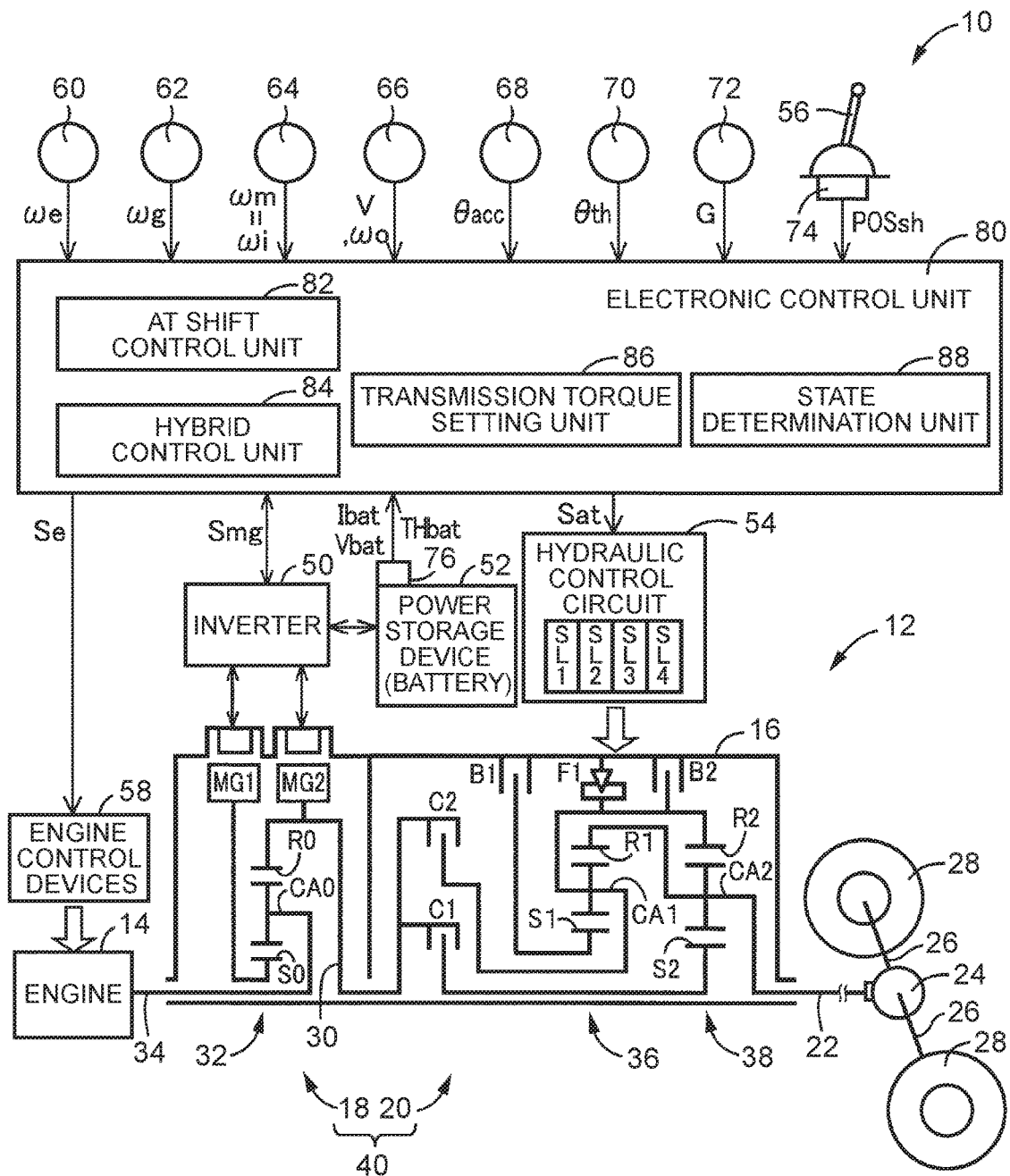
FIG. 1 is a diagram for explaining a schematic configuration of a vehicle driving system included in a vehicle to which the disclosure is applied, and is also a diagram for explaining control functions and a main part of a control system for various controls in the vehicle.

FIG. 1 is a diagram for explaining a schematic configuration of a vehicle driving system 12 included in a vehicle 10 to which the disclosure is applied, and is also a diagram for explaining control functions and a main part of a control system for various controls in the vehicle 10. In FIG. 1, the vehicle driving system 12 includes, in series, an engine 14, an electric continuously variable transmission 18 (hereinafter referred to as a "continuously variable transmission 18"), and a mechanical stepped transmission 20 (hereinafter referred to as a "stepped transmission 20"). The continuously variable transmission 18 is disposed on a common axis in a transmission case 16 (hereinafter referred to as a "case 16") as a non-rotary member attached to a vehicle body and is coupled to the engine 14 directly or indirectly via a damper or the like (not shown). The stepped transmission 20 is coupled to the output side of the continuously variable transmission 18. The vehicle driving system 12 further includes a differential gear device 24 coupled to an output shaft 22 as an output rotary member of the stepped transmission 20, a pair of axles 26 coupled to the differential gear device 24, and so on. In the vehicle driving system 12, power (synonymous with torque or force when not particularly distinguished from each other) output from the engine 14 or a later-described second rotary machine MG2 is transmitted to the stepped transmission 20 and then transmitted from the stepped transmission 20 to drive wheels 28 of the vehicle 10 via the differential gear device 24 and so on. The vehicle driving system 12 is suitably used in, for example, an front-engine rear-drive (FR) vehicle in which the vehicle driving system 12 is longitudinally mounted in the vehicle. The continuously variable transmission 18, the stepped transmission 20, and so on are configured generally symmetrically with respect to the rotation axis (the above-described common axis) of the engine 14 and so on, while illustration of the lower half below the rotation axis is omitted in FIG. 1.

The engine 14 is a power source for traveling of the vehicle 10 and is an internal combustion engine such as a gasoline engine or a diesel engine. Operating states, such as a throttle valve opening degree or an intake air amount, a fuel supply amount, and an ignition timing, of the engine 14 are controlled by a later-described electronic control unit 80, so that engine torque Te as output torque of the engine 14 is controlled. In this embodiment, the engine 14 is coupled to the continuously variable transmission 18 not via a fluid transmission device such as a torque converter or a fluid coupling.

The continuously variable transmission 18 includes a first rotary machine MG1, a differential mechanism 32 as a power distribution mechanism that mechanically distributes power of the engine 14 to the first rotary machine MG1 and to an intermediate transmission member 30 as an output rotary member of the continuously variable transmission 18, and the second rotary machine MG2 coupled to the intermediate transmission member 30 in a power transmittable manner. The continuously variable transmission 18 is an electric continuously variable transmission in which a differential state of the differential mechanism 32 is controlled by control of an operating state of the first rotary machine MG1. The first rotary machine MG1 corresponds to a rotary machine for differential operation (electric motor for differential operation), while the second rotary machine MG2 is an electric motor that functions as a power source, and corresponds to a rotary machine for vehicle traveling (electric motor for vehicle traveling). The vehicle 10 is a hybrid vehicle including the engine 14 and the second rotary machine MG2 as power sources for vehicle traveling.

The first rotary machine MG1 and the second rotary machine MG2 are each a rotary electric machine having a function as an electric motor and a function as an electric generator, i.e. a so-called motor-generator. The first rotary machine MG1 and the second rotary machine MG2 are respectively connected to a battery 52 via an inverter 50. The battery 52 and the inverter 50 are included in the vehicle 10. With the inverter 50 controlled by the later-described electronic control unit 80, MG1 torque Tg and MG2 torque Tm as output torques (power running torque or regenerative torque) of the first rotary machine MG1 and the second rotary machine MG2 are controlled. The battery 52 is an electric power storage device that supplies and receives electric power to and from each of the first rotary machine MG1 and the second rotary machine MG2.

The differential mechanism 32 is configured as a single pinion type planetary gear device and includes a sun gear S0, a carrier CA0, and a ring gear R0. The engine 14 is coupled to the carrier CA0 via a coupling shaft 34 in a power transmittable manner, the first rotary machine MG1 is coupled to the sun gear S0 in a power transmittable manner, and the second rotary machine MG2 is coupled to the ring gear R0 in a power transmittable manner. In the differential mechanism 32, the carrier CA0 functions as an input element, the sun gear S0 functions as a reaction-force element, and the ring gear R0 functions as an output element.

The stepped transmission 20 is a stepped transmission that forms a part of a power transmission path between the intermediate transmission member 30 and the drive wheels 28. The intermediate transmission member 30 functions also as an input rotary member of the stepped transmission 20.

Since the second rotary machine MG2 is coupled to the intermediate transmission member 30 so as to rotate integrally with the intermediate transmission member 30, the stepped transmission 20 is a stepped transmission that forms a part of a power transmission path between the second rotary machine MG2 and the drive wheels 28. The stepped transmission 20 is a known planetary gear type automatic transmission including, for example, a plurality of planetary gear devices, i.e. a first planetary gear device 36 and a second planetary gear device 38, and a plurality of engagement devices, i.e. a clutch C1, a clutch C2, a brake B1, and a brake B2 (hereinafter referred to simply as "engagement devices CB" when not particularly distinguished from each other).

The engagement devices CB are each a hydraulic friction engagement device, such as a multi-disc or single-disc clutch or brake that is pressed by a hydraulic actuator, or a band brake that is fastened by a hydraulic actuator. A torque capacity (hereinafter also referred to as "engaging torque" or "clutch torque") Tcb of each of the engagement devices CB is changed by a regulated engaging hydraulic pressure PRcb that is output from a corresponding one of solenoid valves SL1 to SL4 in a hydraulic control circuit 54 included in the vehicle 10, so that an operating state (state such as engagement or release) of the engagement device CB is changed. In order to transmit torque (e.g. AT input torque Ti as input torque that is input to the stepped transmission 20) between the intermediate transmission member 30 and the output shaft 22 without slipping the engagement device CB (i.e. without generating a differential rotational speed in the engagement device CB), the engaging torque Tcb is required that produces an amount of transmission torque (hereinafter also referred to as "engaging transmission torque" or "clutch transmission torque") which needs to be shared by each of the engagement devices CB (i.e. shared torque of the engagement device CB) with respect to the torque to be transmitted. However, with the engaging torque Tcb that produces the amount of transmission torque, the transmission torque does not increase even by increasing the engaging torque Tcb. That is, the engaging torque Tcb corresponds to maximum torque that can be transmitted by the engagement device CB, while the transmission torque corresponds to torque that is actually transmitted by the engagement device CB. Therefore, in a state where a differential rotational speed is generated in the engagement device CB, the engaging torque Tcb and the transmission torque are synonymous with each other. In this embodiment, the transmission torque of the engagement device CB in a state where a differential rotational speed is generated during shift transition of the stepped transmission 20 (e.g. during an inertia phase) is given by the engaging torque Tcb (i.e. given by the transmission torque Tcb). The engaging torque Tcb (or transmission torque) and the engaging hydraulic pressure PRcb are generally proportional to each other, for example, in a range other than a range where the engaging hydraulic pressure PRcb needed for packing of the engagement device CB is supplied.

In the stepped transmission 20, rotary elements (sun gears S1 and S2, carriers CA1 and CA2, and ring gears R1 and R2) of the first planetary gear device 36 and the second planetary gear device 38 are partially coupled to each other or coupled to the intermediate transmission member 30, the case 16, or the output shaft 22, directly or indirectly (or selectively) via the engagement device CB or a one-way clutch F1.

The stepped transmission 20 engages the predetermined ones of the engagement devices CB so as to establish a corresponding one of a plurality of speed positions (gear positions) having different speed ratios (gear ratios) γat (=AT input rotational speed ωi/output rotational speed ωo). In this embodiment, gear positions established by the stepped transmission 20 will be referred to as "AT gear positions". The AT input rotational speed ωi is an input rotational speed of the stepped transmission 20 which is a rotational speed (angular velocity) of the input rotary member of the stepped transmission 20, and is equal in value to a rotational speed of the intermediate transmission member 30 and equal in value to an MG2 rotational speed ωm which is a rotational speed of the second rotary machine MG2. The AT input rotational speed ωi can be given by MG2 rotational speed ωm. The output rotational speed ωo is a rotational speed of the output shaft 22 which is an output rotational speed of the stepped transmission 20, and is also an output rotational speed of an entire transmission 40 as a combination of the continuously variable transmission 18 and the stepped transmission 20.

Figures 2, 3:
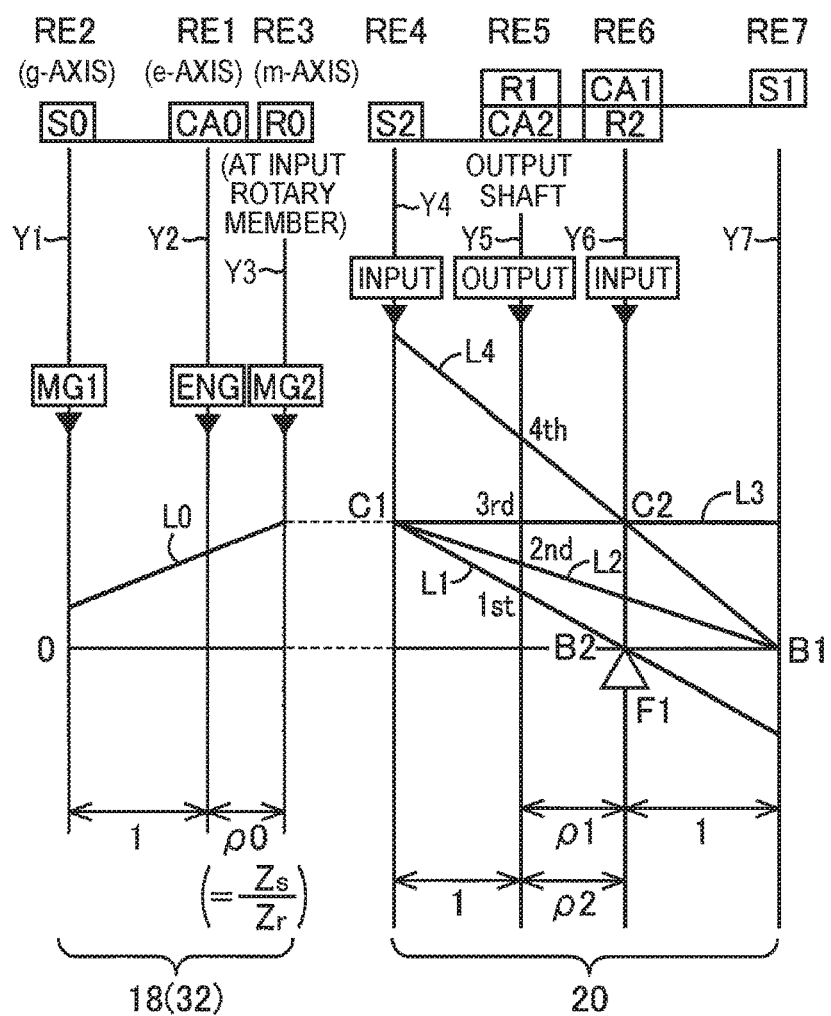
FIG. 2 is an operation table for explaining the relationship between shift operation of a mechanical stepped transmission illustrated in FIG. 1 and a combination of operations of engagement devices for use in the shift operation.
FIG. 3 is a nomogram showing the relative relationship of rotational speeds of respective rotary elements in an electric continuously variable transmission and the mechanical stepped transmission.

For example, as shown in an engagement operation table of FIG. 2, the stepped transmission 20 establishes, as a plurality of AT gear positions, four forward AT gear positions, i.e. an AT first-speed gear position (1st in FIG. 2) to an AT fourth-speed gear position (4th in FIG. 2). The speed ratio γat of the AT first-speed gear position is greatest, while the speed ratio γat becomes smaller on the higher vehicle speed side (on the higher-side AT fourth-speed gear position side). The engagement operation table of FIG. 2 summarizes the relationship between each of the AT gear positions and operating states of the engagement devices CB (the predetermined engagement devices that are engaged in each of the AT gear positions). In FIG. 2, "o" indicates engagement, "Δ" indicates engagement when engine brake is applied or when the stepped transmission 20 is shifted down during coasting, and blank indicates release. Since the one-way clutch F1 is provided in parallel to the brake B2 that establishes the AT first-speed gear position, there is no need to engage the brake B2 when the vehicle is started (accelerated). Of power-off downshifts in which a downshift is determined (required) due to a decrease in vehicle-speed related value (e.g. vehicle speed V) during deceleration running caused by a decrease in drive request amount (e.g. accelerator pedal position θacc) or accelerator-off (accelerator pedal position θacc is zero or approximately zero), the coasting downshift of the stepped transmission 20 is a downshift required in an accelerator-off deceleration running state. When all the engagement devices CB are released, the stepped transmission 20 is placed in a neutral state where none of the gear positions is established (i.e. neutral state where power transmission is interrupted).

Release of the release-side engagement device of the engagement devices CB (i.e. of the predetermined engagement devices that establish the AT gear position before shifting) and engagement of the engagement-side engagement device of the engagement devices CB (i.e. of the predetermined engagement devices that establish the AT gear position after shifting) are controlled according to an accelerator pedal operation by a driver, a vehicle speed V, and so on by the later-described electronic control unit 80 (particularly a later-described AT shift control unit 82 that performs shift control of the stepped transmission 20), so that the stepped transmission 20 changes the AT gear position to be established (i.e. selectively establishes the plurality of AT gear positions). That is, in the shift control of the stepped transmission 20, the stepped transmission 20 performs so-called clutch-to-clutch shifting, for example, by engaging and releasing corresponding ones of the engagement devices CB (i.e. by switching engagement and release of the engagement devices CB). For example, in a downshift from the AT second-speed gear position to the AT first-speed gear position (given by "2→1 downshift"), as shown in the engagement operation table of FIG. 2, the brake B1 as the release-side engagement device is released, while the brake B2 as the engagement-side engagement device is engaged. In this event, the release transient hydraulic pressure of the brake B1 and the engagement transient hydraulic pressure of the brake B2 are regulated.

FIG. 3 is a nomogram showing the relative relationship of rotational speeds of the respective rotary elements in the continuously variable transmission 18 and the stepped transmission 20. In FIG. 3, three vertical lines Y1, Y2, and Y3 corresponding to the three rotary elements of the differential mechanism 32 constituting the continuously variable transmission 18 are, in order from the left side, a g-axis representing the rotational speed of the sun gear S0 corresponding to a second rotary element RE2, an e-axis representing the rotational speed of the carrier CA0 corresponding to a first rotary element RE1, and an m-axis representing the rotational speed of the ring gear R0 (i.e. the input rotational speed of the stepped transmission 20) corresponding to a third rotary element RE3. Four vertical lines Y4, Y5, Y6, and Y7 of the stepped transmission 20 are, in order from the left side, an axis representing the rotational speed of the sun gear S2 corresponding to a fourth rotary element RE4, an axis representing the rotational speed of the mutually coupled ring gear R1 and carrier CA2 (i.e. the rotational speed of the output shaft 22) corresponding to a fifth rotary element RE5, an axis representing the rotational speed of the mutually coupled carrier CA1 and ring gear R2 corresponding to a sixth rotary element RE6, and an axis representing the rotational speed of the sun gear S1 corresponding to a seventh rotary element RE7. The intervals between adjacent two of the vertical lines Y1, Y2, and Y3 are determined according to a gear ratio $\rho 0$ of the differential mechanism 32. The intervals between adjacent two of the vertical lines Y4, Y5, Y6, and Y7 are determined according to respective gear ratios $\rho 1$ and $\rho 2$ of the first planetary gear device 36 and the second planetary gear device 38. In the relationship of the intervals between the vertical axes in the nomogram, when the interval between the sun gear and the carrier is set to an interval corresponding to "1", the interval between the carrier and the ring gear is set to an interval corresponding to a gear ratio $\rho$ (=the number of teeth Zs of the sun gear/the number of teeth Zr of the ring gear) of the planetary gear device.

Referring to the nomogram of FIG. 3, in the differential mechanism 32 of the continuously variable transmission 18, the engine 14 (see "ENG" in FIG. 3) is coupled to the first rotary element RE1, the first rotary machine MG1 (see "MG1" in FIG. 3) is coupled to the second rotary element RE2, and the second rotary machine MG2 (see "MG2" in FIG. 3) is coupled to the third rotary element RE3 that rotates integrally with the intermediate transmission member 30, such that rotation of the engine 14 is transmitted to the stepped transmission 20 via the intermediate transmission member 30. In the continuously variable transmission 18, the relationship between the rotational speed of the sun gear S0 and the rotational speed of the ring gear R0 is indicated by a straight line L0 that crosses the vertical line Y2.

In the stepped transmission 20, the fourth rotary element RE4 is selectively coupled to the intermediate transmission member 30 via the clutch C1, the fifth rotary element RE5 is coupled to the output shaft 22, the sixth rotary element RE6 is selectively coupled to the intermediate transmission member 30 via the clutch C2 and selectively coupled to the case 16 via the brake B2, and the seventh rotary element RE7 is selectively coupled to the case 16 via the brake B1. In the stepped transmission 20, the respective rotational speeds of the output shaft 22 in the "1st", "2nd", "3rd", and "4th" positions are indicated by respective straight lines L1, L2, L3, and L4 that cross the vertical line Y5 by engagement/release control of the engagement devices CB.

The straight line L0 and the straight lines L1, L2, L3, and L4 indicated by solid lines in FIG. 3 show the relative speeds of the respective rotary elements in forward travel in a hybrid travel mode that enables engine travel in which the vehicle travels using at least the engine 14 as a power source. In the hybrid travel mode, in the differential mechanism 32, when reaction-force torque as negative torque produced by the first rotary machine MG1 is input in positive rotation to the sun gear S0 while engine torque Te is input to the carrier CA0, engine direct torque Td ($=Te/(1+\rho)=-(1/\rho)\times Tg$) appears on the ring gear R0 as positive torque in positive rotation. Then, according to a required driving force, the total torque of the engine direct torque Td and MG2 torque Tm is transmitted as driving torque in the forward direction of the vehicle 10 to the drive wheels 28 via the stepped transmission 20 in which one of the AT first-speed gear position to the AT fourth-speed gear position is established. In this event, the first rotary machine MG1 functions as an electric generator that produces negative torque when it is in positive rotation. Electric power Wg generated by the first rotary machine MG1 is charged into the battery 52 or consumed by the second rotary machine MG2. The second rotary machine MG2 outputs MG2 torque Tm using the whole or part of the generated electric power Wg or using electric power from the battery 52 in addition to the generated electric power Wg.

Although not shown in FIG. 3, in a nomogram for a motor travel mode that enables motor travel in which the vehicle travels using the second rotary machine MG2 as a power source with the engine 14 stopped, the carrier CA0 is not rotated, and MG2 torque Tm is input to the ring gear R0 as positive torque in positive rotation, in the differential mechanism 32. In this event, the first rotary machine MG1 coupled to the sun gear S0 is placed in a no-load state and is idled in negative rotation. That is, in the motor travel mode, the engine 14 is not driven so that an engine rotational speed we as the rotational speed of the engine 14 is set to zero, and the MG2 torque Tm (herein, power running torque in positive rotation) is transmitted as driving torque in the forward direction of the vehicle 10 to the drive wheels 28 via the stepped transmission 20 in which one of the AT first-speed gear position to the AT fourth-speed gear position is established. In reverse travel of the vehicle 10, for example, in the motor travel mode, MG2 torque Tm is input to the ring gear R0 as negative torque in negative rotation and is transmitted as driving torque in the reverse direction of the vehicle 10 to the drive wheels 28 via the stepped transmission 20 in which the forward AT first-speed gear position is established.

In the vehicle driving system 12, the continuously variable transmission 18 is configured that includes the differential mechanism 32 having the three rotary elements, i.e. the carrier CA0 as the first rotary element RE1 to which the engine 14 is coupled in a power transmittable manner, the sun gear S0 as the second rotary element RE2 to which the first rotary machine MG1 is coupled in a power transmittable manner, and the ring gear R0 as the third rotary element RE3 to which the intermediate transmission member 30 is coupled (from a different point of view, to which the second rotary machine MG2 is coupled in a power transmittable manner), and that functions as an electric speed change mechanism (electric differential mechanism) in which the differential state of the differential mechanism 32 is controlled by controlling the operating state of the first rotary machine MG1. That is, the continuously variable transmission 18 is configured that includes the differential mechanism 32 to which the engine 14 is coupled in a power transmittable manner, and the first rotary machine MG1 coupled to the differential mechanism 32 in a power transmittable manner, such that the differential state of the differential mechanism 32 is controlled by controlling the operating state of the first rotary machine MG1. The continuously variable transmission 18 is operated as an electric continuously variable transmission that changes a speed ratio $\gamma 0$ ($=\omega e/\omega m$) of the rotational speed of the coupling shaft 34 (i.e. engine rotational speed $\omega e$) to the MG2 rotational speed $\omega m$ as the rotational speed of the intermediate transmission member 30.

For example, in the hybrid travel mode, when the rotational speed of the sun gear S0 is increased or decreased by controlling the rotational speed of the first rotary machine MG1, relative to the rotational speed of the ring gear R0 which is restricted by rotation of the drive wheels 28 due to establishment of the AT gear position in the stepped transmission 20, the rotational speed of the carrier CA0 (i.e. engine rotational speed $\omega e$) is increased or decreased. Accordingly, in the engine travel, the engine 14 can be operated at a highly efficient operating point. That is, using the stepped transmission 20 in which the AT gear position is established, and the continuously variable transmission 18 that is operated as a continuously variable transmission, the entire transmission 40 in which the continuously variable transmission 18 (synonymous with the differential mechanism 32) and the stepped transmission 20 are disposed in series can be configured as a continuously variable transmission.

Since the continuously variable transmission 18 can be shifted as a stepped transmission, the entire transmission 40 can be shifted as a stepped transmission using the stepped transmission 20 in which the AT gear position is established, and the continuously variable transmission 18 that is shifted as a stepped transmission. That is, in the transmission 40, the stepped transmission 20 and the continuously variable transmission 18 can be controlled such that a plurality of gear positions (hereinafter referred to as "virtual gear positions") having different speed ratios $\gamma t$ ($=\omega e/\omega o$) of the engine rotational speed we to the output rotational speed coo are selectively established. The speed ratio $\gamma t$ is the total speed ratio that is formed by the continuously variable transmission 18 and the stepped transmission 20 disposed in series, and takes a value ($\gamma t=\gamma 0 \times \gamma at$) that is obtained by multiplying together the speed ratio $\gamma 0$ of the continuously variable transmission 18 and the speed ratio $\gamma at$ of the stepped transmission 20.

The virtual gear positions are allocated such that, for example, by combinations of each of the AT gear positions of the stepped transmission 20 and one or a plurality of speed ratios $\gamma 0$ of the continuously variable transmission 18, one or a plurality of virtual gear positions are established for each of the AT gear positions of the stepped transmission 20. For example, FIG. 4 is one example of a gear position allocation table (gear position assignment table) which is determined in advance such that a virtual first-speed gear position to a virtual third-speed gear position are established with respect to the AT first-speed gear position, a virtual fourth-speed gear position to a virtual sixth-speed gear position are established with respect to the AT second-speed gear position, a virtual seventh-speed gear position to a virtual ninth-speed gear position are established with respect to the AT third-speed gear position, and a virtual tenth-speed gear position is established with respect to the AT fourth-speed gear position.

Figures 4, 5:
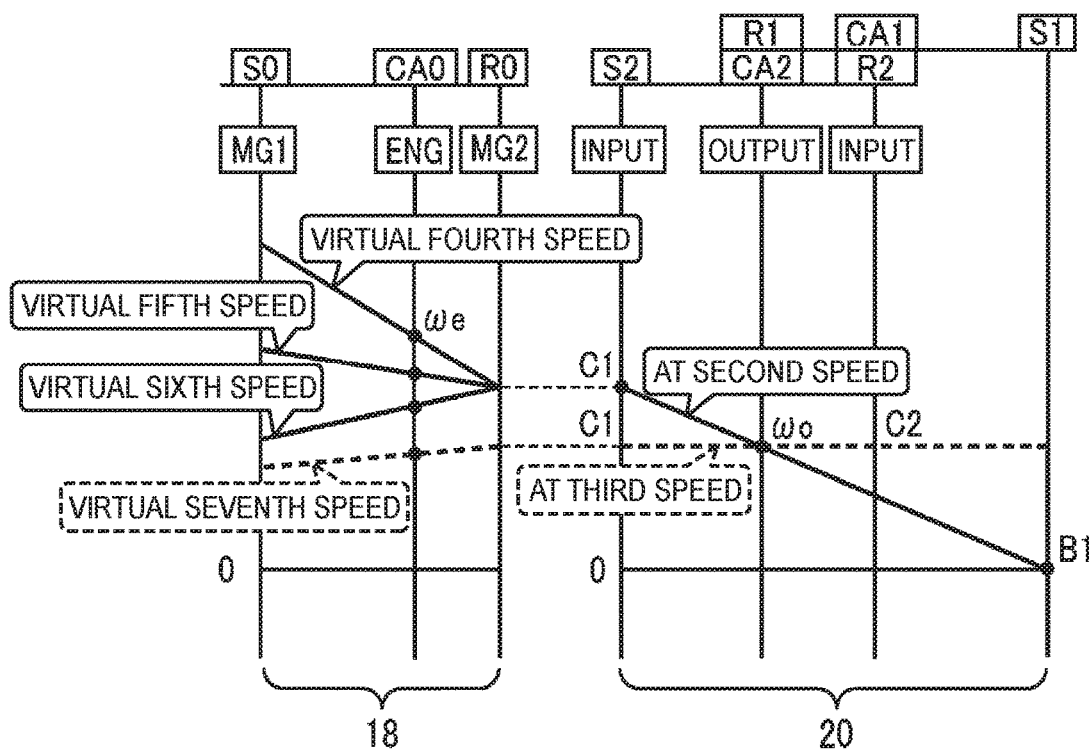
FIG. 4 is a diagram for explaining one example of a gear position allocation table in which a plurality of virtual gear positions are allocated to a plurality of AT gear positions.
FIG. 5 is a diagram in which AT gear positions of the stepped transmission and virtual gear positions of a transmission are shown on the same nomogram as FIG. 3.

FIG. 5 is a diagram in which the AT gear positions of the stepped transmission 20 and the virtual gear positions of the transmission 40 are shown on the same nomogram as FIG. 3. In FIG. 5, solid lines illustrate a case in which the virtual fourth-speed gear position to the virtual sixth-speed gear position are established when the stepped transmission 20 is placed in the AT second-speed gear position. In the transmission 40, the continuously variable transmission 18 is controlled so as to provide an engine rotational speed we that realizes a predetermined speed ratio $\gamma t$ with respect to an output rotational speed coo, so that the different virtual gear position is established in the certain AT gear position. A broken line illustrates a case in which the virtual seventh-speed gear position is established when the stepped transmission 20 is placed in the AT third-speed gear position. In the transmission 40, the virtual gear position is changed by controlling the continuously variable transmission 18 according to change of the AT gear position.

Referring back to FIG. 1, the vehicle 10 further includes the electronic control unit 80 as a controller including a control system of the vehicle 10 relating to control of the engine 14, the continuously variable transmission 18, the stepped transmission 20, and so on. Accordingly, FIG. 1 is a diagram showing an input/output system of the electronic control unit 80 and is also a functional block diagram for explaining a main part of control functions performed by the electronic control unit 80. The electronic control unit 80 includes a so-called microcomputer having, for example, a CPU, a RAM, a ROM, and an input/output interface, and the CPU performs various controls of the vehicle 10 by implementing signal processing according to programs stored in advance in the ROM while using the temporary storage function of the RAM. The electronic control unit 80 is configured to be divided into subunits for engine control, shift control, and so on as needed.

The electronic control unit 80 is supplied with various signals based on detection values detected by various sensors included in the vehicle 10. The sensors include, for example, an engine rotational speed sensor 60, an MG1 rotational speed sensor 62, an MG2 rotational speed sensor 64, an output rotational speed sensor 66, an accelerator pedal position sensor 68, a throttle valve opening degree sensor 70, a G sensor 72, a shift position sensor 74, and a battery sensor 76. The signals include, for example, an engine rotational speed $\omega e$, an MG1 rotational speed $\omega g$ as the rotational speed of the first rotary machine MG1, an MG2 rotational speed $\omega m$ as an AT input rotational speed $\omega i$, an output rotational speed coo corresponding to a vehicle speed V, an accelerator pedal position $\theta acc$ as an acceleration operation amount (i.e. an operation amount of an accelerator pedal) by a driver indicative of the magnitude of acceleration operation by the driver, a throttle valve opening degree $\theta th$ as the opening degree of an electronic throttle valve, a longitudinal acceleration G of the vehicle 10, an operating position POSsh of a shift lever 56 as a shift operating member included in the vehicle 10, and a battery temperature THbat, a battery charge/discharge current Ibat, and a battery voltage Vbat of the battery 52. The electronic control unit 80 outputs various command signals to respective devices included in the vehicle 10. The devices include, for example, engine control devices 58 such as a throttle actuator, fuel injection devices, and ignition devices, the inverter 50, and the hydraulic control circuit 54. The command signals include, for example, an engine control command signal Se for controlling the engine 14, a rotary machine control command signal Smg for controlling each of the first rotary machine MG1 and the second rotary machine MG2, and a hydraulic control command signal Sat for controlling each of the operating states of the engagement devices CB (i.e. for controlling the shifting of the stepped transmission 20). The hydraulic control command signal Sat is, for example, a command signal (drive current) for driving each of the solenoid valves SL1 to SL4 that regulate the engaging hydraulic pressures PRcb supplied to the respective hydraulic actuators of the engagement devices CB, and is output to the hydraulic control circuit 54. The electronic control unit 80 sets a hydraulic command value (also called a "command pressure") corresponding to a value of the engaging hydraulic pressure PRcb supplied to each hydraulic actuator for obtaining a target engaging torque Tcb of the corresponding engagement device CB, and outputs a drive current corresponding to the hydraulic command value. The electronic control unit 80 calculates a state of charge (charge capacity) SOC of the battery 52 based on, for example, the battery charge/discharge current Ibat and the battery voltage Vbat.

For realizing various controls in the vehicle 10, the electronic control unit 80 includes an AT shift control means as a shift control means, i.e. an AT shift control unit 82 as a shift control unit, and a hybrid control means, i.e. a hybrid control unit 84.

The AT shift control unit 82 makes a determination on shifting of the stepped transmission 20 according to a predetermined relationship (e.g. AT gear position shift map) that is experimentally or theoretically obtained and stored in advance. If necessary, the AT shift control unit 82 performs shift control of the stepped transmission 20 by outputting to the hydraulic control circuit 54 a hydraulic control command signal Sat for changing the engaged/released states of the engagement devices CB by the solenoid valves SL1 to SL4, so as to automatically change the AT gear position of the stepped transmission 20. The AT gear position shift map defines a predetermined relationship having shift lines (up-shift lines and downshift lines), which are for determining whether or not the stepped transmission 20 is to be shifted, on a two-dimensional coordinate system having, for example, the output rotational speed coo (herein, synonymous with vehicle speed V or the like) and the accelerator pedal position θacc (herein, synonymous with required driving torque Tdem, throttle valve opening degree θth, or the like) as parameters.

The hybrid control unit 84 has a function as an engine control means, i.e. an engine control unit, for controlling operation of the engine 14, and a function as a rotary machine control means, i.e. a rotary machine control unit, for controlling operation of the first rotary machine MG1 and the second rotary machine MG2 via the inverter 50. Using these control functions, the hybrid control unit 84 performs hybrid drive control and so on by the engine 14, the first rotary machine MG1, and the second rotary machine MG2. The hybrid control unit 84 calculates required driving power Pdem (from a different point of view, required driving torque Tdem at the vehicle speed V at that time) by applying the accelerator pedal position θacc and the vehicle speed V to a predetermined relationship (e.g. driving force map). The hybrid control unit 84 outputs command signals (engine control command signal Se and rotary machine control command signal Smg) for controlling the engine 14, the first rotary machine MG1, and the second rotary machine MG2, so as to realize the required driving power Pdem. The engine control command signal Se is, for example, a command value of engine power Pe as power of the engine 14 that outputs engine torque Te at the engine rotational speed ωe at that time. The rotary machine control command signal Smg is, for example, a command value of generation electric power Wg of the first rotary machine MG1 that outputs reaction-force torque (MG1 torque Tg at the MG1 rotational speed ωg at that time) against engine torque Te, or a command value of consumption electric power Wm of the second rotary machine MG2 that outputs MG2 torque Tm at the MG2 rotational speed ωm at that time.

When, for example, operating the continuously variable transmission 18 as a continuously variable transmission so as to operate the entire transmission 40 as a continuously variable transmission, the hybrid control unit 84 controls the engine 14 and the generation electric power Wg of the first rotary machine MG1 in consideration of an engine optimum fuel efficiency point and so on so as to provide an engine rotational speed ωe and engine torque Te that can obtain engine power Pe that realizes the required driving power Pdem, thereby performing continuous shift control of the continuously variable transmission 18 to change the speed ratio γ0 of the continuously variable transmission 18. As a result of this control, the speed ratio γt of the transmission 40 when operated as a continuously variable transmission is controlled.

When, for example, shifting the continuously variable transmission 18 as a stepped transmission so as to shift the entire transmission 40 as a stepped transmission, the hybrid control unit 84 makes a determination on shifting of the transmission 40 according to a predetermined relationship (e.g. virtual gear position shift map) and, in cooperation with shift control of the AT gear position of the stepped transmission 20 by the AT shift control unit 82, the hybrid control unit 84 performs shift control of the continuously variable transmission 18 so as to selectively establish the plurality of virtual gear positions. The plurality of virtual gear positions can be established by controlling the engine rotational speed ωe by the first rotary machine MG1 according to the output rotational speed coo in such a way that the respective speed ratios γt can be maintained. The speed ratio γt of each virtual gear position is not necessarily a constant value over the entire range of the output rotational speed coo and may be changed in a predetermined range or may be limited by the upper or lower limit of the rotational speed of the respective parts or the like.

Figure 6:
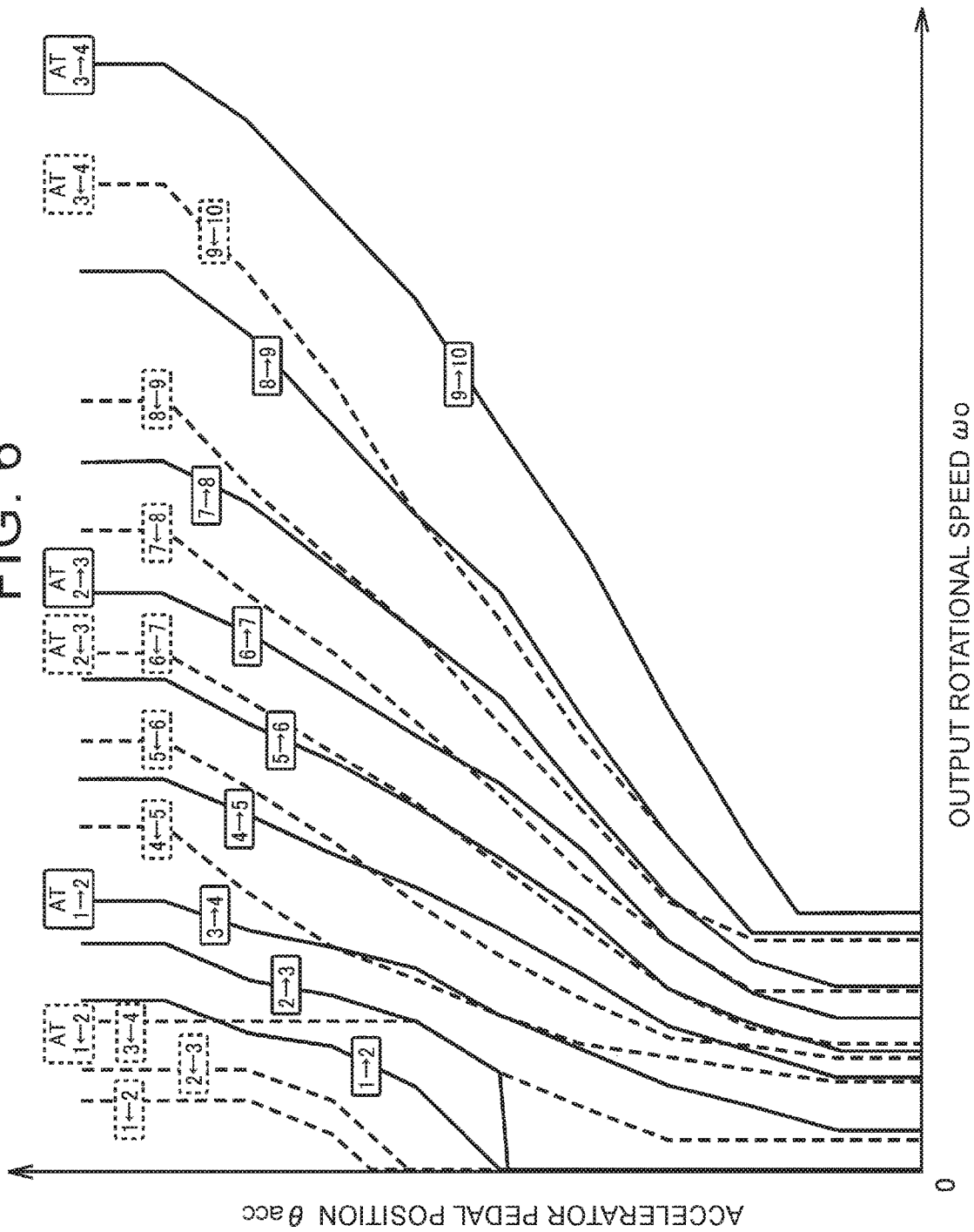
FIG. 6 is a diagram for explaining one example of a virtual gear position shift map for use in shift control of a plurality of virtual gear positions.

The virtual gear position shift map is determined in advance using the output rotational speed coo and the accelerator pedal position θacc as parameters like the AT gear position shift map. FIG. 6 is one example of the virtual gear position shift map, wherein solid lines are upshift lines and broken lines are downshift lines. By changing the virtual gear position according to the virtual gear position shift map, a shift feeling similar to that of a stepped transmission is obtained with the entire transmission 40 in which the continuously variable transmission 18 and the stepped transmission 20 are disposed in series. Virtual stepped shift control that shifts the entire transmission 40 as a stepped transmission may only be performed in preference to continuous shift control that operates the entire transmission 40 as a continuously variable transmission, for example, when a travel mode attaching importance to traveling performance, such as a sports travel mode, is selected by a driver, or when the required driving torque Tdem is relatively large. Alternatively, the virtual stepped shift control may basically be performed except at a predetermined time during which the virtual stepped shift control is prohibited.

The virtual stepped shift control by the hybrid control unit 84 and the shift control of the stepped transmission 20 by the AT shift control unit 82 are cooperatively performed. In this embodiment, ten virtual gear positions, i.e. the virtual first-speed gear position to the virtual tenth-speed gear position, are allocated to four AT gear positions, i.e. the AT first-speed gear position to the AT fourth-speed gear position. Accordingly, when a shift between the virtual third-speed gear position and the virtual fourth-speed gear position (given by "virtual 3⇔4 shift") is performed, a shift between the AT first-speed gear position and the AT second-speed gear position (given by "AT 1⇔2 shift") is performed, when virtual 6⇔7 shift is performed, AT 2⇔3 shift is performed, and when virtual 9⇔10 shift is performed, AT 3⇔4 shift is performed (see FIG. 4). Therefore, the AT gear position shift map is determined such that a shift of the AT gear position is performed at the same timing as a shift of the virtual gear position. Specifically, upshift lines of "3→4", "6→7", and "9→10" of the virtual gear positions in FIG. 6 coincide with upshift lines of "1→2", "2→3", and "3→4" of the AT gear position shift map (see "AT 1→2" and so on described in FIG. 6). Likewise, downshift lines of "3←4", "6←7", and "9←10" of the virtual gear positions in FIG. 6 coincide with downshift lines of "1←2", "2←3", and "3←4" of the AT gear position shift map (see "AT 1←2" and so on described in FIG. 6). Alternatively, it may be configured that, based on a shift determination of the virtual gear position using the virtual gear position shift map of FIG. 6, a shift command of the AT gear position is output to the AT shift control unit 82. In this way, when the stepped transmission 20 is shifted up, the entire transmission 40 is shifted up, and when the stepped transmission 20 is shifted down, the entire transmission 40 is shifted down. The AT shift control unit 82 changes the AT gear position of the stepped transmission 20 when the virtual gear position is changed. Since the AT gear position is shifted at the same timing as the shift timing of the virtual gear position, the stepped transmission 20 is shifted with change in engine rotational speed ωe, so that, even with shock due to the shifting of the stepped transmission 20, a driver is less likely to feel a sense of incongruity.

The hybrid control unit 84 selectively establishes, as the travel mode, the motor travel mode or the hybrid travel mode according to the traveling state. For example, when the required driving power Pdem is in a motor travel range in which it is smaller than a predetermined threshold value, the hybrid control unit 84 establishes the motor travel mode, while, when the required driving power Pdem is in an engine travel range in which it is equal to or greater than the predetermined threshold value, the hybrid control unit 84 establishes the hybrid travel mode. On the other hand, even when the required driving power Pdem is in the motor travel range, if the charge capacity SOC of the battery 52 is less than a predetermined threshold value, the hybrid control unit 84 establishes the hybrid travel mode.

Herein, the virtual stepped shift control of the transmission 40 when shifting of the stepped transmission 20 takes place will be described in detail. During shifting of the stepped transmission 20 (particularly in an inertia phase during shift transition) by the AT shift control unit 82, the hybrid control unit 84 controls the MG1 torque Tg and the MG2 torque Tm based on the engine torque Te and the transmission torque Tcb of the shift progress side engagement device, on the side progressing the shifting, of the release-side engagement device and the engagement-side engagement device in the stepped transmission 20, such that an MG2 angular acceleration dωm/dt as the change rate of the MG2 rotational speed ωm and an engine angular acceleration dωe/dt as the change rate of the engine rotational speed ωe reach respective target values thereof.

In the shift control of the stepped transmission 20, there are various shift patterns (shift modes) such as a power-on upshift, a power-off upshift, a power-on downshift, and a power-off downshift. The shift at power-on is a shift that is determined, for example, by an increase in accelerator pedal position θacc or an increase in vehicle speed V in a state where accelerator-on is maintained, while the shift at power-off is a shift that is determined, for example, by a decrease in accelerator pedal position θacc or a decrease in vehicle speed V in a state where accelerator-off is maintained. Assuming that it is in a state where the transmission torque Tcb is not produced in either of the release-side engagement device and the engagement-side engagement device during shifting, the AT input rotational speed ωi is increased spontaneously at power-on, while the AT input rotational speed ωi is decreased spontaneously at power-off. Therefore, in the power-on upshift or the power-off downshift in which the AT input rotational speed ωi cannot be changed spontaneously toward a synchronous rotational speed ωisyca after the shifting (=ωo×speed ratio γata after shifting), it is preferable to progress the shifting by producing the transmission torque Tcb in the engagement-side engagement device that establishes the AT gear position after the shifting. On the other hand, in the power-off upshift or the power-on downshift in which the AT input rotational speed ωi can be changed spontaneously toward a synchronous rotational speed ωisyca after the shifting, it is preferable to progress the shifting by decreasing the transmission torque Tcb in the release-side engagement device that establishes the AT gear position before the shifting. Therefore, the shift progress side engagement device in the power-on upshift or the power-off downshift is the engagement-side engagement device, while the shift progress side engagement device in the power-off upshift or the power-on downshift is the release-side engagement device.

Specifically, the hybrid control unit 84 calculates MG1 torque Tg and MG2 torque Tm based on target values of an MG2 angular acceleration dωm/dt and an engine angular acceleration dωe/dt, engine torque Te, and AT transmission torque Tat, using a predetermined formula (1) given below. The hybrid control unit 84 outputs rotary machine control command signals Smg for obtaining the calculated MG1 torque Tg and MG2 torque Tm, respectively, to the inverter 50. The formula (1) is a formula derived, for example, based on an equation of motion given by inertia, angular acceleration, and on-shaft torque that is established for each of the g-axis, the e-axis, and the m-axis (see FIG. 3) in the continuously variable transmission 18, and expressions of relation that are defined by the continuously variable transmission 18 being two degrees of freedom (i.e. two degrees of freedom such that when the rotational speeds of two of the three axes are determined, the rotational speed of the remaining one axis is determined). Therefore, respective values a11, . . . , b11, . . . , c22 in 2×2 matrices in the formula (1) respectively take values composed of combinations of the inertias of the rotary members constituting the continuously variable transmission 18, the gear ratio ρ0 of the differential mechanism 32, and so on.

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

The target values of the MG2 angular acceleration dωm/dt and the engine angular acceleration dωe/dt in the formula (1) are predetermined, for example, according to which of various shift patterns shifting of the stepped transmission 20 is, according to which of the AT gear positions shifting is between, and according to which of the virtual gear positions shifting is between. The engine torque Te in the formula (1) is, for example, engine torque Te at an engine rotational speed ωe when engine power Pe that realizes required driving power Pdem is obtained.

The AT transmission torque Tat in the formula (1) is a total value of converted values obtained by converting onto the intermediate transmission member 30 (i.e. the m-axis) transmission torques that the engagement devices CB respectively need to share when shifting the stepped transmission 20 (i.e. the total value is a value obtained by converting onto the intermediate transmission member 30 transmission torque that the stepped transmission 20 transmits). The formula (1) is a model formula when progressing shifting of the stepped transmission 20, and therefore, in this embodiment, for the sake of convenience, the AT transmission torque Tat in the formula (1) is given by transmission torque Tcb of the shift progress side engagement device that serves as the main engagement device to progress the shifting. In the formula (1), a feedforward value is given as a value of the transmission torque Tcb of the shift progress side engagement device. Therefore, the electronic control unit 80 further includes a transmission torque setting means, i.e. a transmission torque setting unit 86, that sets transmission torque Tcb of the shift progress side engagement device.

In the setting of the transmission torque Tcb of the shift progress side engagement device by the transmission torque setting unit 86, it may be considered to set a value of the transmission torque Tcb of the shift progress side engagement device according to AT input torque Ti based on engine power Pe that realizes required driving power Pdem, using a relationship determined in advance per type of shifting that differs according to the shift pattern of the stepped transmission 20, according to which of the AT gear positions the shifting is between, or the like, in order to balance shift shock, shift time, and so on of the stepped transmission 20. However, when battery power Pbat as power of the battery 52 is small during shifting, there is a possibility that, due to the limitation of the battery power Pbat, it is difficult to output MG1 torque Tg and MG2 torque Tm according to values calculated by the formula (1) based on the transmission torque Tcb of the shift progress side engagement device which does not take into account the battery power Pbat, so that the MG2 angular acceleration dωm/dt and the engine angular acceleration dωe/dt cannot be properly controlled to their target values. In particular, since the engine rotational speed ωe can be controlled independently of the shift control of the stepped transmission 20 in the transmission 40 (i.e. since the engine rotational speed ωe cannot be controlled only by the shift control of the stepped transmission 20), there is a possibility that the engine angular acceleration dωe/dt cannot be properly controlled to its target value.

In view of this, the transmission torque setting unit 86 sets the transmission torque Tcb of the shift progress side engagement device taking into account the battery power Pbat. Since the battery 52 is controlled on the basis of power (electric power), the transmission torque Tcb of the shift progress side engagement device is set in terms of power.

Specifically, the transmission torque setting unit 86 sets the transmission torque Tcb of the shift progress side engagement device based on the engine power Pe (power Pe of the engine 14), power Pina (hereinafter referred to as "shift progressing power Pina") necessary for progressing shifting of the continuously variable transmission 18 (the differential mechanism 32) and the stepped transmission 20, and the battery power Pbat (power Pbat of the battery power), such that limitation of the MG1 torque Tg and the MG2 torque Tm due to the limitation of the battery power Pbat when shifting the stepped transmission 20. The shift progressing power Pina is power that is necessary when the intermediate transmission member 30, the engine 14, and so on change in rotation during shifting, and is rotation changing power according to the rates of rotational energy change in the continuously variable transmission 18 and the stepped transmission 20.

Figure 7:
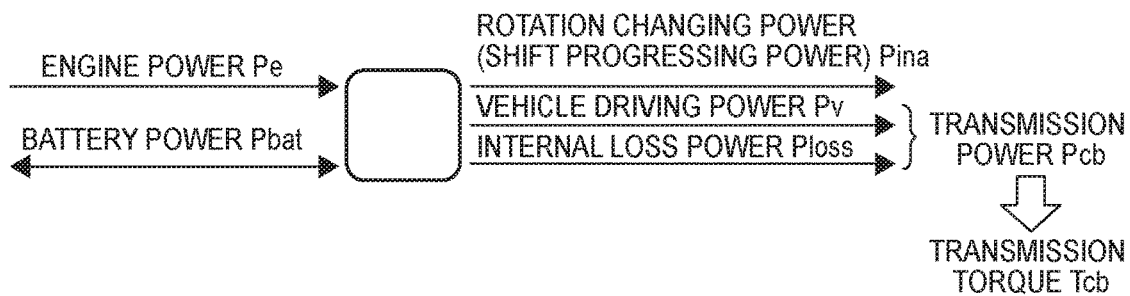
FIG. 7 is a conceptual diagram of the balance of powers in virtual stepped shift control of the transmission when shifting of the stepped transmission takes place.

FIG. 7 is a conceptual diagram of the balance of powers in the virtual stepped shift control of the transmission 40 when shifting of the stepped transmission 20 takes place. In FIG. 7, total power of vehicle driving power Pv and internal loss power Ploss is transmission power Pcb of the shift progress side engagement device. The battery power Pbat is usable battery power Pbat of the battery 52 and is chargeable/dischargeable electric power Win, Wout, i.e. chargeable electric power (inputtable electric power) Win that defines the limitation of input electric power of the battery 52, and dischargeable electric power (outputtable electric power) Wout that defines the limitation of output electric power of the battery 52. Basic way of thinking when setting the transmission torque Tcb of the shift progress side engagement device is to achieve the input-output balance of the powers as shown in FIG. 7. The transmission torque setting unit 86 sets the transmission torque Tcb of the shift progress side engagement device, that can obtain the transmission power Pcb of the shift progress side engagement device, based on the engine power Pe, the shift progressing power Pina, and the battery power Pbat such that a relationship of the powers in the virtual stepped shift control of the transmission 40 as shown by a formula (2) given below is established (i.e. the input-output balance of the powers is achieved). The transmission power Pcb of the shift progress side engagement device is proportional to the vehicle speed V. Since the vehicle speed V does not generally change during shifting, the magnitude of the transmission power Pcb of the shift progress side engagement device and the magnitude of the transmission torque Tcb of the shift progress side engagement device are generally proportional to each other. Therefore, using a relationship (map) between the transmission power Pcb of the shift progress side engagement device and the transmission torque Tcb of the shift progress side engagement device that is determined in advance using the vehicle speed V as a parameter, the transmission torque Tcb may be set based on the vehicle speed V and the transmission power Pcb. The battery power Pbat in the formula (2) takes a positive value on the discharge side (power supply side) of the battery 52.

$$Pe+Pbat=Pcb+Pina \qquad (2)$$

While the transmission torque Tcb of the shift progress side engagement device may be set using the formula (2) as described above, the transmission torque Tcb of the shift progress side engagement device may alternatively be set based on numerical values themselves of the engine power Pe, the shift progressing power Pina, and the battery power Pbat using a predetermined relationship (map) between the engine power Pe/the shift progressing power Pina/the battery power Pbat and the transmission power Pcb (or the transmission torque Tcb) of the shift progress side engagement device. However, when the transmission torque Tcb of the shift progress side engagement device is set based on numerical values themselves of the respective powers, the number of states that each power can take becomes large so that the map becomes high dimensional, and therefore, adaptation becomes complicated.

In contrast, in this embodiment, when the transmission torque Tcb of the shift progress side engagement device is set using the predetermined relationship (map), there is proposed a technique that makes the map low dimensional so as to simplify adaptation. In this technique, the engine power Pe, the shift progressing power Pina, and the battery power Pbat are each classified into a plurality of levels corresponding to magnitudes thereof. The plurality of levels are, for example, large, middle, and small three levels, or large and small two levels that are divided by predetermined threshold values. A relationship (map) in which a combination of the levels of the respective powers and transmission torque Tcb of the shift progress side engagement device are correlated with each other is determined in advance, and using this map, the transmission torque Tcb of the shift progress side engagement device is set based on a combination of the levels obtained by classifying the respective actual powers. That is, the transmission torque setting unit 86 has a predetermined relationship (map, also called a "low-dimensional map") in which a plurality of levels corresponding to magnitudes of each of the engine power Pe, the shift progressing power Pina, and the battery power Pbat are used as arguments such that the transmission torque Tcb of the shift progress side engagement device is readable as a read value according to the arguments, and using this low-dimensional map, the transmission torque setting unit 86 sets the transmission torque Tcb of the shift progress side engagement device. As the arguments, for example, the large, middle, and small levels may be used as they are, or numerical values (e.g. 3, 2, and 1) respectively assigned to the large, middle, and small levels may be used.

Specifically, the transmission torque setting unit 86 calculates an estimated value of generation power of the engine 14 as the engine power Pe that serves as the basis when setting the transmission torque Tcb of the shift progress side engagement device. For example, the transmission torque setting unit 86 calculates an estimated value of generation power of the engine 14 based on an engine control command signal Se (a command value of the engine power Pe) that is output by the hybrid control unit 84. Therefore, the estimated value of generation power of the engine 14 is a required value of the engine power Pe that realizes the required driving power Pdem.

The transmission torque setting unit 86 calculates an estimated value of the shift progressing power Pina. For example, as shown by a formula (3) given below, the transmission torque setting unit 86 calculates an estimated value of the shift progressing power Pina as consumption inertia power by dividing a rotational energy difference ΔE (=Eaft−Ebfr) as consumption inertia energy in the continuously variable transmission 18 and the stepped transmission 20 before and after shifting of the stepped transmission 20, by a target shift time Tina of the stepped transmission 20 as a target inertia phase time determined in advance per type of shifting (e.g. "2→3 upshift" or "3→2 downshift") of the stepped transmission 20. In the formula (3), Eaft is rotational energy after shifting, while Ebfr is rotational energy before shifting. As shown by a formula (4) given below, the transmission torque setting unit 86 calculates rotational energy E. That is, using the formula (4), the transmission torque setting unit 86 calculates the before-shifting rotational energy Ebfr based on the MG2 rotational speed ωm before shifting, the engine rotational speed ωe before shifting, and the MG1 rotational speed ωg before shifting, and calculates the after-shifting rotational energy Eaft based on the MG2 rotational speed ωm after shifting, the engine rotational speed ωe after shifting, and the MG1 rotational speed ωg after shifting. The MG2 rotational speed ωm before or after shifting is calculated by ωo (output rotational speed)×γat (speed ratio of the AT gear position of the stepped transmission 20 before or after shifting). The engine rotational speed ωe before or after shifting is calculated by ωo (output rotational speed)×γt (speed ratio of the virtual gear position of the transmission 40 before or after shifting). The MG1 rotational speed ωg before or after shifting is calculated using a formula (5) given below which is determined in advance based on a relative relationship between the rotational speeds of the three rotary elements in the differential mechanism 32. In the formula (4), Im is inertia on the intermediate transmission member 30 (i.e. the second rotary machine MG2+the stepped transmission 20) which is determined per AT gear position of the stepped transmission 20 (i.e. depends on the engagement states of the engagement devices CB in the stepped transmission 20). Ie is inertia of the engine 14. Ig is inertia of the first rotary machine MG1. In the formula (5), ρ0 is the gear ratio of the differential mechanism 32.

$$Pina=(Eaft-Ebfr)/Tina \quad (3)$$

$$E=(Im \times \omega m^2 + Ie \times \omega e^2 + Ig \times \omega g^2)/2 \quad (4)$$

$$\omega g = (1+\rho 0)/\rho 0 \times \omega e - (1/\rho 0) \times \omega m \quad (5)$$

The transmission torque setting unit 86 calculates estimated values of usable battery power Pbat (i.e. chargeable/dischargeable electric power Win, Wout) as the battery power Pbat that serves as the basis when setting the transmission torque Tcb of the shift progress side engagement device. For example, the transmission torque setting unit 86 calculates estimated values of the chargeable/dischargeable electric power Win, Wout of the battery 52 based on the battery temperature THbat and the charge capacity SOC of the battery 52. For example, the chargeable/dischargeable electric power Win, Wout is set to be smaller as the battery temperature THbat decreases in a low temperature range where the battery temperature THbat is lower than a normal use range, and is set to be smaller as the battery temperature THbat increases in a high temperature range where the battery temperature THbat is higher than the normal use range. For example, the chargeable electric power Win is set to be smaller as the charge capacity SOC increases in a range where the charge capacity SOC is large, while the dischargeable electric power Wout is set to be smaller as the charge capacity SOC decreases in a range where the charge capacity SOC is small.

The transmission torque setting unit 86 classifies each of the calculated engine power Pe, shift progressing power Pina, and battery power Pbat into one of the plurality of levels (arguments) corresponding to the magnitude thereof. Using the low-dimensional map, the transmission torque setting unit 86 sets the transmission torque Tcb of the shift progress side engagement device based on those arguments. In the vehicle 10, it is supposed that the input-output balance of the powers is achieved by solely controlling the battery 52 as a side to receive the power. For example, this may be the case where the engine power Pe is large and the shift progressing power Pina as a side to receive the power is small, such as in the case where the AT gear position on the high speed side (high gear side) is changed during high speed travel. Therefore, as the battery power Pbat, it is preferable to use the estimated value of the chargeable electric power Win of the battery 52. However, in the case of a vehicle in which there occurs a state in which the engine power Pe is small and the shift progressing power Pina is large, the estimated value of the dischargeable electric power Wout of the battery 52 is used instead of the chargeable electric power Win as appropriate.

Herein, in order to perform stable shifting that does not rely on the battery power Pbat, it is necessary to achieve the balance between the engine power Pe, the shift progressing power Pina, and the transmission power Pcb of the shift progress side engagement device. However, for example, in a power-on downshift that is performed in a range where the battery power Pbat (chargeable electric power Win) is small and the shift progressing power Pina is small, the MG2 rotational speed ωm becomes difficult to change so that the shifting becomes difficult to progress in a state where the transmission torque Tcb of the shift progress side engagement device becomes greater than the engine torque Te. In a state where the transmission torque Tcb of the shift progress side engagement device is limited so that the transmission torque Tcb of the shift progress side engagement device becomes sufficiently smaller than the engine torque Te so as to facilitate the progress of the shifting, excess engine power Pe may be used to increase the engine rotational speed ωe so that there is a possibility of a rapid increase in engine rotational speed ωe. In view of this, in the state where the battery power Pbat (chargeable electric power Win) is small and the shift progressing power Pina is small, the hybrid control unit 84 causes the engine power Pe to be smaller than the required value. For example, in a power-off downshift that is performed in a range where the battery power Pbat (dischargeable electric power Wout) is small and the shift progressing power Pina is large, there is a possibility that the engine power Pe becomes insufficient. In view of this, the hybrid control unit 84 causes the engine power Pe to be greater than the required value. Therefore, the electronic control unit 80 further includes a state determination means, i.e. a state determination unit 88, that determines whether or not the input-output balance of the respective powers, i.e. the engine power Pe, the shift progressing power Pina, the battery power Pbat, and the transmission power Pcb of the shift progress side engagement device, is achieved.

The state determination unit 88 determines whether or not the input-output balance of the respective powers, i.e. the engine power Pe, the shift progressing power Pina, the battery power Pbat, and the transmission power Pcb of the shift progress side engagement device, is achieved, for example, based on the shift progressing power Pina and the battery power Pbat (chargeable/dischargeable electric power Win, Wout) that are calculated by the transmission torque setting unit 86. For example, when the level of the engine power Pe classified by the transmission torque setting unit 86 is large, the level of the shift progressing power Pina classified by the transmission torque setting unit 86 is small, and the level of the battery power Pbat (chargeable electric power Win) classified by the transmission torque setting unit 86 is small, the state determination unit 88 determines that the input-output balance of the respective powers is not achieved (i.e. the engine power Pe becomes excess).

When the state determination unit 88 has determined that the input-output balance of the respective powers is not achieved, the hybrid control unit 84 changes the engine power Pe by predetermined power from the required value such that the input-output balance of the respective powers is achieved. In the case where the engine power Pe becomes excess, this predetermined power is, for example, a predetermined decrease amount for shifting the level of the engine power Pe, classified by the transmission torque setting unit 86, from large to middle or to small.

When the state determination unit 88 has determined that the input-output balance of the respective powers is not achieved, the transmission torque setting unit 86 uses the engine power Pe changed by the hybrid control unit 84, as the engine power Pe that serves as the basis when setting the transmission torque Tcb of the shift progress side engagement device.

In an upshift of the transmission 40 when a power-on upshift of the stepped transmission 20 takes place, the AT input rotational speed ωi is decreased toward the synchronous rotational speed ωisyca after shifting by controlling the engagement-side engagement device toward engagement. Therefore, an engagement force of the engagement-side engagement device is exerted in a direction to decrease the AT input rotational speed ωi and thus in a direction to decrease the engine rotational speed ωe. That is, the direction of the work of the engagement-side engagement device and the direction of the change of the engine rotational speed ωe in the upshift of the transmission 40 are the same as each other. Therefore, even if the input-output balance of the respective powers is lost during shifting using the set transmission torque Tcb of the shift progress side engagement device, a deviation from the target value of the engine angular acceleration dωe/dt is hardly conspicuous. For this reason, in the power-on upshift of the stepped transmission 20, even if the number of the levels classifying each of the engine power Pe, the shift progressing power Pina, and the battery power Pbat is small, no problem may arise.

On the other hand, in a downshift of the transmission 40 when a power-on downshift of the stepped transmission 20 takes place, the AT input rotational speed ωi is increased toward the synchronous rotational speed ωisyca after shifting by controlling the release-side engagement device toward release. Therefore, an engagement force of the release-side engagement device is exerted in a direction to decrease the AT input rotational speed ωi and thus in a direction to decrease the engine rotational speed ωe. That is, the direction of the work of the release-side engagement device and the direction of the change of the engine rotational speed ωe in the downshift of the transmission 40 are opposite to each other. Therefore, if the input-output balance of the respective powers is lost during shifting using the set transmission torque Tcb of the shift progress side engagement device, a deviation from the target value of the engine angular acceleration dωe/dt tends to be conspicuous. For this reason, in the power-on downshift of the stepped transmission 20, it is necessary to increase the number of the levels classifying each of the engine power Pe, the shift progressing power Pina, and the battery power Pbat so as to set more accurate transmission torque Tcb of the shift progress side engagement device.

In view of the above, the number of the levels in the power-on downshift of the stepped transmission 20 is set to be greater than the number of the levels in the power-on upshift of the stepped transmission 20.

Figure 8:
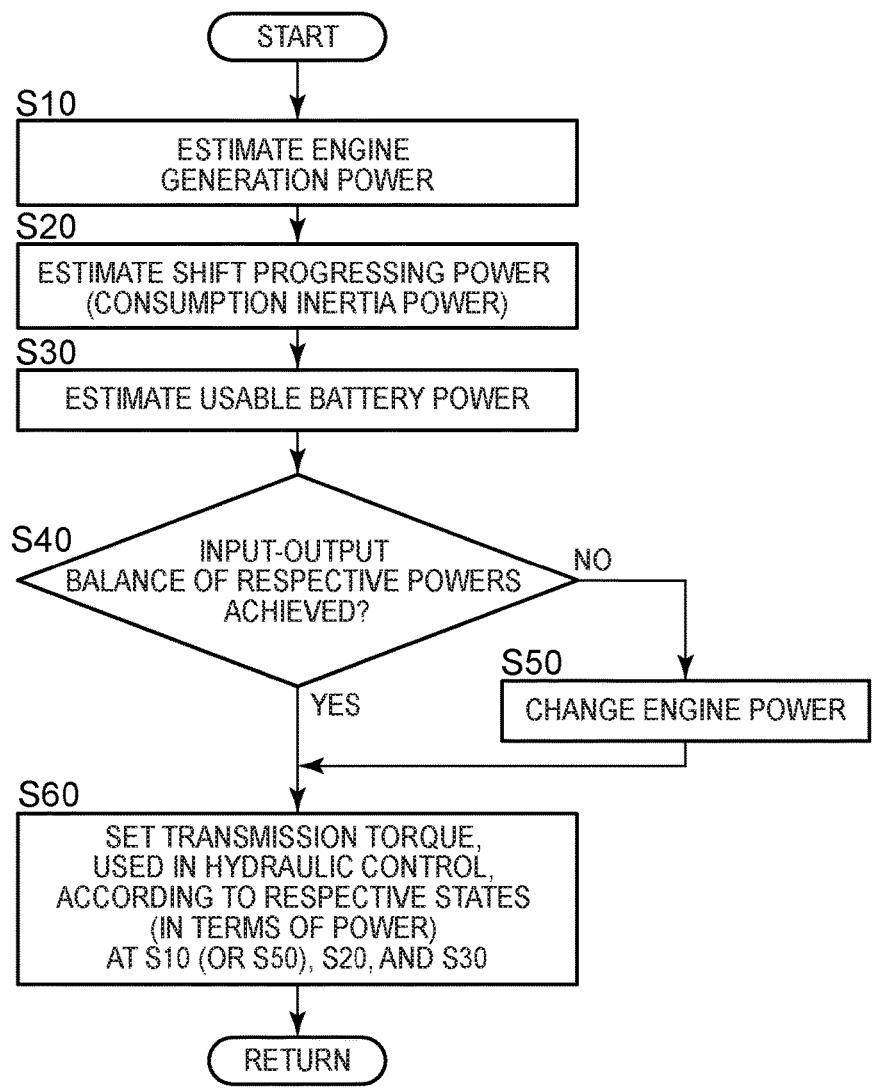
FIG. 8 is a flowchart for explaining a main part of control operation of an electronic control unit, i.e. control operation for properly performing shifting of the entire transmission regardless of the limitation of battery power.

FIG. 8 is a flowchart for explaining a main part of the control operation of the electronic control unit 80, i.e. the control operation for properly performing shifting of the entire transmission 40 regardless of the limitation of the battery power Pbat. The flowchart is repeatedly executed, for example, in the virtual stepped shift control of the transmission 40 when shifting of the stepped transmission 20 takes place.

In FIG. 8, first, at step S10 corresponding to the function of the transmission torque setting unit 86, an estimated value of generation power of the engine 14 is calculated. Then, at step S20 corresponding to the function of the transmission torque setting unit 86, an estimated value of the shift progressing power Pina as consumption inertia power is calculated. Then, at step S30 corresponding to the function of the transmission torque setting unit 86, estimated values of usable battery power Pbat (i.e. chargeable/dischargeable electric power Win, Wout) are calculated. Then, at step S40 corresponding to the function of the state determination unit 88, it is determined whether or not the input-output balance of the respective powers, i.e. the engine power Pe, the shift progressing power Pina, the battery power Pbat, and the transmission power Pcb of the shift progress side engagement device, is achieved. If the determination at step S40 is negative, then at step S50 corresponding to the function of the hybrid control unit 84, the engine power Pe is changed (increased or decreased) from the required value such that the input-output balance of the respective powers is achieved. If the determination at step S40 is affirmative, or subsequently to step S50, then at step S60 corresponding to the function of the transmission torque setting unit 86, the transmission torque Tcb of the shift progress side engagement device that is used in hydraulic control in shifting of the stepped transmission 20 is set according to the respective states (in terms of power) at step S10 (or step S50), step S20, and step S30. That is, the engine power Pe, the shift progressing power Pina, and the battery power Pbat are each classified into one of the plurality of levels (arguments) corresponding to the magnitude thereof, and using the low-dimensional map, the transmission torque Tcb of the shift progress side engagement device is set based on those arguments.

As described above, according to this embodiment, since the transmission torque Tcb of the shift progress side engagement device is set based on the engine power Pe, the shift progressing power Pina, and the battery power Pbat such that it is suppressed that the MG1 torque Tg and the MG2 torque Tm are limited due to the limitation of the battery power Pbat when shifting the stepped transmission 20, the stepped transmission 20 is shifted with the transmission torque Tcb of the shift progress side engagement device which takes into account the input-output balance of the respective powers. Consequently, even if the battery power Pbat is limited when shifting the stepped transmission 20, desired MG1 torque Tg and MG2 torque Tm tend to be obtained, so that control can be properly performed so as to cause the engine angular acceleration dωe/dt to reach the target value. Therefore, shifting of the entire transmission 40 can be properly performed regardless of the limitation of the battery power Pbat.

According to this embodiment, when the input-output balance of the respective powers is not achieved, the engine power Pe is changed such that the input-output balance of the respective powers is achieved, and the changed engine power Pe is used as the engine power Pe that serves as the basis when setting the transmission torque Tcb of the shift progress side engagement device, so that shifting of the stepped transmission 20 that further takes into account the input-output balance of the respective powers is performed. Consequently, shifting of the entire transmission 40 can be more properly performed.

According to this embodiment, the transmission torque Tcb of the shift progress side engagement device is set using a predetermined relationship (map) in which a plurality of levels corresponding to magnitudes of each of the engine power Pe, the shift progressing power Pina, and the battery power Pbat are used as arguments such that the transmission torque Tcb of the shift progress side engagement device is readable as a read value according to the arguments, and therefore, by setting the transmission torque Tcb of the shift progress side engagement device by means of classifications using the plurality of levels corresponding to the magnitudes of each of the respective powers (i.e. by decreasing the number of arguments), the predetermined relationship can be made low dimensional to simplify adaptation.

According to this embodiment, the number of the levels in a power-on downshift of the stepped transmission 20 when a downshift of the entire transmission 40 is performed is set to be greater than the number of the levels in a power-on upshift of the stepped transmission 20 when an upshift of the entire transmission 40 is performed, so that the power-on downshift of the stepped transmission 20 that is difficult in shift control compared to the power-on upshift of the stepped transmission 20 can be properly performed. In this way, since the number of arguments can be changed according to the type of shift (e.g. according to the degree of difficulty of shift control), adaptation can be more simplified as shift control becomes easier.

While the embodiment of the disclosure has been described in detail with reference to the drawings, the disclosure is applicable also to other configurations.

For example, in the flowchart of FIG. 8 in the above-described embodiment, the transmission torque Tcb of the shift progress side engagement device is set using the low-dimensional map, but the disclosure is not limited to this configuration. For example, at step S60 in the flowchart of FIG. 8, the transmission torque Tcb of the shift progress side engagement device may be set using the formula (2), or the transmission torque Tcb of the shift progress side engagement device may be set based on numerical values themselves of the respective powers, i.e. the engine power Pe, the shift progressing power Pina, and the battery power Pbat, using a predetermined relationship (e.g. high-dimensional map). In either case, as shown at step S50 in the flowchart of FIG. 8, when the input-output balance of the respective powers is not achieved, the engine power Pe may be changed (increased or decreased) from the required value.

In the above-described embodiment, when setting the transmission torque Tcb of the shift progress side engagement device using the low-dimensional map, the engine power Pe, the shift progressing power Pina, and the battery power Pbat are each classified into one of the plurality of levels (arguments) corresponding to the magnitude thereof, and the transmission torque Tcb of the shift progress side engagement device is set based on those arguments. Therefore, it is not necessary to precisely calculate respective estimated values of the engine power Pe, the shift progressing power Pina, and the battery power Pbat. That is, it is sufficient if classification can be achieved, and therefore, for example, in classification of the shift progressing power Pina, levels classified using the rotational energy difference ΔE (=Eaft−Ebfr) may be used as levels of the shift progressing power Pina, i.e. without using the shift progressing power Pina.

Setting of the transmission torque Tcb of the shift progress side engagement device taking into account the shift control using the formula (1) and the input-output balance of the respective powers in the above-described embodiment can be applied not only to virtual stepped shift control of the transmission 40 when shifting of the stepped transmission 20 takes place, but also to shift control of the stepped transmission 20 when the entire transmission 40 is operated as a continuously variable transmission.

In the above-described embodiment, the stepped transmission 20 is the planetary gear type automatic transmission that establishes the four forward AT gear positions, but the disclosure is not limited to this configuration. For example, the stepped transmission 20 may satisfactorily be a stepped transmission that engages predetermined ones of a plurality of engagement devices so as to establish a corresponding one of a plurality of gear positions. Such a stepped transmission may be a planetary gear type automatic transmission like the stepped transmission 20, or an automatic transmission such as a dual clutch transmission (DCT) which is a synchromesh parallel two-axis type automatic transmission of the type having input shafts on two systems such that engagement devices (clutches) are respectively coupled to the input shafts of the two systems and further coupled to even-number stages and odd-number stages. In the case of the DCT, the predetermined engagement devices correspond to the engagement devices respectively coupled to the input shafts of the two systems.

In the above-described embodiment, when shifting the entire transmission 40 as a stepped transmission, the virtual gear position is changed using the virtual gear position shift map, but the disclosure is not limited to this configuration. For example, the virtual gear position of the transmission 40 may be changed according to a shift command from a driver using the shift lever 56, an up/down switch, or the like.

In the above-described embodiment, the ten virtual gear positions are allocated to the four AT gear positions, but the disclosure is not limited to this configuration. The number of the virtual gear positions is satisfactorily equal to or greater than the number of the AT gear positions. The number of the virtual gear positions may be equal to the number of the AT gear positions, but is desirably greater than the number of the AT gear positions. For example, the number of the virtual gear positions is appropriately twice or more the number of the AT gear positions. Shifting of the AT gear position is performed in such a way that the rotational speed of the intermediate transmission member 30 and the second rotary machine MG2 coupled to the intermediate transmission member 30 is held in a predetermined rotational speed range, while shifting of the virtual gear position is performed in such a way that the engine rotational speed ωe is held in a predetermined rotational speed range. The number of the virtual gear positions and the number of the AT gear positions are determined as appropriate.

In the above-described embodiment, the differential mechanism 32 is configured as the single pinion type planetary gear device having the three rotary elements, but the disclosure is not limited to this configuration. For example, the differential mechanism 32 may be a differential mechanism having four or more rotary elements such that a plurality of planetary gear devices are coupled to each other. The differential mechanism 32 may be a double planetary gear device. The differential mechanism 32 may be a differential gear device having a pinion that is rotationally driven by the engine 14, and a pair of bevel gears meshing with the pinion. The first rotary machine MG1 and the intermediate transmission member 30 are respectively coupled to the bevel gears.

The above-described embodiment is merely by way of example, and the disclosure can be carried out with various changes or improvements based on the knowledge of those skilled in the art.

What is claimed is:

1. A control device for a hybrid vehicle,
the hybrid vehicle including an engine, a differential mechanism, a drive wheel, a first rotary machine, a second rotary machine, a stepped transmission, and an electric power storage device, the differential mechanism including a first rotary element to which the engine is coupled in a power transmittable manner, a second rotary element to which the first rotary machine is coupled in a power transmittable manner, and a third rotary element to which an intermediate transmission member is coupled, the second rotary machine being coupled to the intermediate transmission member in a power transmittable manner, the stepped transmission being a part of a power transmission path between the intermediate transmission member and the drive wheel, the stepped transmission being configured to engage predetermined engagement devices of a plurality of engagement devices so as to establish a corresponding one of a plurality of gear positions, and the electric power storage device being configured to supply and receive electric power to and from each of the first rotary machine and the second rotary machine,
the control device comprising:
an electronic control unit configured to control release of a release-side engagement device of the predetermined engagement devices that establish the gear position before shifting and engagement of an engagement-side engagement device of the predetermined engagement devices that establish the gear position after shifting, such that the gear position that is established by the stepped transmission is changed, wherein
during shifting of the stepped transmission, the electronic control unit is configured to control output torque of the first rotary machine and output torque of the second rotary machine based on output torque of the engine and transmission torque of a shift progress side engagement device such that a change rate of a rotational speed of the second rotary machine and a change rate of a rotational speed of the engine reach respective target values, the shift progress side engagement device being an engagement device on a side progressing the shifting and being one of the release-side engagement device and the engagement-side engagement device, and
the electronic control unit is configured to set transmission torque of the shift progress side engagement device based on power of the engine, power necessary for progressing shifting of the differential mechanism and the stepped transmission, and chargeable/dischargeable electric power of the electric power storage device, such that limitation of output torque of the first rotary machine and output torque of the second rotary machine due to limitation of the chargeable/dischargeable electric power of the electric power storage device when shifting the stepped transmission is suppressed.

2. The control device according to claim 1, wherein
the electronic control unit is configured to determine whether or not input-output balance of the power of the engine, the power necessary for progressing the shifting, the chargeable/dischargeable electric power of the electric power storage device, and transmission power of the shift progress side engagement device is achieved,
when the electronic control unit determines that the input-output balance is not achieved, the electronic control unit is configured to change the power of the engine such that the input-output balance is achieved, and the electronic control unit is configured to use the changed power of the engine as the power of the engine that serves as a basis when setting the transmission torque of the shift progress side engagement device.

3. The control device according to claim 1, wherein
the electronic control unit is configured to set the transmission torque of the shift progress side engagement device based on a predetermined relationship in which a plurality of levels corresponding to magnitudes of each of the power of the engine, the power necessary for progressing the shifting, and the chargeable/dischargeable electric power of the electric power storage device are used as arguments such that the transmission torque of the shift progress side engagement device is readable as a read value according to the arguments.

4. The control device according to claim 3, wherein
when the stepped transmission is shifted up, the electronic control unit is configured to perform an upshift of an entire transmission in which the differential mechanism and the stepped transmission are disposed in series,
the electronic control unit is configured to perform a downshift of the entire transmission when the stepped transmission is shifted down, and
the number of the levels in a power-on downshift of the stepped transmission is greater than the number of the levels in a power-on upshift of the stepped transmission.

5. A control method for a hybrid vehicle,
the hybrid vehicle including an engine, a differential mechanism, a drive wheel, a first rotary machine, a second rotary machine, a stepped transmission, an electric power storage device, and an electronic control unit, the differential mechanism including a first rotary element to which the engine is coupled in a power transmittable manner, a second rotary element to which the first rotary machine is coupled in a power transmittable manner, and a third rotary element to which an intermediate transmission member is coupled, the second rotary machine being coupled to the intermediate transmission member in a power transmittable manner, the stepped transmission being a part of a power transmission path between the intermediate transmission member and the drive wheel, the stepped transmission being configured to engage predetermined engagement devices of a plurality of engagement devices so as to establish a corresponding one of a plurality of gear positions, the electric power storage device being configured to supply and receive electric power to and from each of the first rotary machine and the second rotary machine,
the control method comprising:
controlling, by the electronic control unit, release of a release-side engagement device of the predetermined engagement devices that establish the gear position before shifting and engagement of an engagement-side engagement device of the predetermined engagement devices that establish the gear position after shifting, such that the gear position that is established by the stepped transmission is changed;
during shifting of the stepped transmission, controlling, by the electronic control unit, output torque of the first rotary machine and output torque of the second rotary machine based on output torque of the engine and transmission torque of a shift progress side engagement device such that a change rate of a rotational speed of the second rotary machine and a change rate of a rotational speed of the engine reach respective target values, the shift progress side engagement device being an engagement device on a side progressing the shifting and being one of the release-side engagement device and the engagement-side engagement device; and
setting, by the electronic control unit, transmission torque of the shift progress side engagement device based on power of the engine, power necessary for progressing shifting of the differential mechanism and the stepped transmission, and chargeable/dischargeable electric power of the electric power storage device, such that limitation of output torque of the first rotary machine and output torque of the second rotary machine due to limitation of the chargeable/dischargeable electric power of the electric power storage device when shifting the stepped transmission is suppressed.

* * * * *